US007155638B1

(12) United States Patent
Heideman et al.

(10) Patent No.: US 7,155,638 B1
(45) Date of Patent: Dec. 26, 2006

(54) CLUSTERED COMPUTER SYSTEM UTILIZING SEPARATE SERVERS FOR REDUNDANCY IN WHICH THE HOST COMPUTERS ARE UNAWARE OF THE USAGE OF SEPARATE SERVERS

(75) Inventors: Michael J. Heideman, New Brighton, MN (US); Dennis R. Konrad, Welch, MN (US); David A. Novak, Coon Rapids, MN (US); Carl R. Crandall, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 480 days.

(21) Appl. No.: 10/346,933

(22) Filed: Jan. 17, 2003

(51) Int. Cl.
*G06F 11/00* (2006.01)
(52) U.S. Cl. ....................................................... 714/11
(58) Field of Classification Search .................... 714/6, 714/11, 12
See application file for complete search history.

(56) References Cited

U.S. PATENT DOCUMENTS

| | | | | |
|---|---|---|---|---|
| 5,157,663 A * | 10/1992 | Major et al. | ................... | 714/10 |
| 5,228,127 A * | 7/1993 | Ikeda et al. | .................. | 709/225 |
| 5,530,845 A * | 6/1996 | Hiatt et al. | .................... | 703/27 |
| 5,852,724 A * | 12/1998 | Glenn et al. | ................. | 709/239 |
| 5,940,826 A | 8/1999 | Heideman et al. | ............. | 707/8 |
| 5,941,999 A * | 8/1999 | Matena et al. | ................. | 714/6 |
| 6,145,094 A * | 11/2000 | Shirriff et al. | ................ | 714/11 |
| 6,163,856 A * | 12/2000 | Dion et al. | ..................... | 714/4 |
| 6,223,231 B1 * | 4/2001 | Mankude | ...................... | 710/38 |
| 6,609,213 B1 * | 8/2003 | Nguyen et al. | ................ | 714/4 |
| 6,625,750 B1 * | 9/2003 | Duso et al. | .................... | 714/11 |
| 6,675,217 B1 * | 1/2004 | Dani et al. | ................... | 709/229 |
| 6,883,065 B1 * | 4/2005 | Pittelkow et al. | ........... | 711/114 |
| 6,965,893 B1 * | 11/2005 | Chan et al. | ..................... | 707/8 |
| 7,047,299 B1 * | 5/2006 | Curtis | ......................... | 709/225 |
| 7,058,846 B1 * | 6/2006 | Kelkar et al. | .................. | 714/4 |
| 7,062,674 B1 * | 6/2006 | Takamoto | ..................... | 714/13 |
| 2002/0095470 A1 * | 7/2002 | Cochran et al. | ............ | 709/208 |
| 2003/0158933 A1 * | 8/2003 | Smith | .......................... | 709/224 |
| 2003/0187927 A1 * | 10/2003 | Winchell | ..................... | 709/204 |

OTHER PUBLICATIONS

A. Butt, J. Hasan, K. Khalid, and F. Mirza, Economical Fault-Tolerant Networks, vol. 2000, Issue 74, Article No. 6, Jun. 2000.*
Webopedia, "What is a Server?", http://www.webopedia.com/TERM/c/server.html, Jul. 26, 2004, pp. 1-3.*
Webopedia, "What is a computer?", http://www.webopedia.com/TERM/c/computer.html, 2006, Jan. 4, 2002, 1-4.*

* cited by examiner

*Primary Examiner*—Bryce P. Bonzo
(74) *Attorney, Agent, or Firm*—Charles A. Johnson; Mark T. Starr; Nawrocki, Rooney & Sivertson, P.A.

(57) ABSTRACT

An apparatus for and method of enhancing reliability within a cluster lock processing system having a relatively large number of commodity cluster instruction processors which are managed by a cluster lock manager. Because the commodity processors have virtually no system viability features such as memory protection, failure recovery, etc., the cluster/lock processors assume the responsibility for providing these functions. The low cost of the commodity cluster instruction processors makes the system almost linearly scalable. The cluster/locking, caching, and mass storage accessing functions are fully integrated into a single hardware platform which performs the role of the master. Upon failure of this hardware platform, a second redundant hardware platform converts from slave to master role. The logic for the failure detection and role swapping is placed within software, which can run as an application under a commonly available operating system. Furthermore, the recovery is completely accomplished without assistance of the Host computer(s) or ultimate user(s) coupled via the Host computer(s).

20 Claims, 18 Drawing Sheets

Data Structure Definition

Segment Descriptor Pointer Table

Segment Descriptors

Segment Data

Process Index Table

Lock Index Table

Sub-Application Table

Validity Index Table

Recovery In Progress Table

Message Control Table

Head-of-Host Table (w/o message buffers)

Message Buffers

Miscellaneous Information

CLUSTERED COMPUTER SYSTEM UTILIZING SEPARATE SERVERS FOR REDUNDANCY IN WHICH THE HOST COMPUTERS ARE UNAWARE OF THE USAGE OF SEPARATE SERVERS

CROSS REFERENCE TO CO-PENDING APPLICATIONS

U.S. patent application Ser. No. 10/346,392, filed Jan. 17, 2003, and entitled, "Outboard Clustered Computer Systems Manager Utilizing Commodity Components"; U.S. patent application Ser. No. 10/346,458, filed Jan. 17, 2003, and entitled, "Ability to Support Non-Proprietary Locking Protocols"; U.S. patent application Ser. No. 10/346,301, filed Jan. 17, 2003, and entitled, "Support for Two-Phase Commit in Multi-Host Systems"; U.S. patent application Ser. No. 10/346,458, filed Jan. 17, 2003, and entitled, "Standard Channel I/O Processor (SCIOP)"; U.S. patent application Ser. No. 10/346,390, filed Jan. 17, 2003, and entitled, "A Method for Generating a Unique Identifier and Verifying a Software License in a Computer System Utilizing Separate Server for Redundancy"; U.S. patent application Ser. No. 10/346,696, filed Jan. 17, 2003, and entitled, "Software Control Using the Controller As a Component To Achieve Resiliency In a Computer System Utilizing Separate Servers For Redundancy"; U.S. patent application Ser. No. 10/346,489, filed Jan. 17, 2003, and entitled, "A Method for Allowing a Clustered Computer Systems Manager to Use Disparate Hardware on Each of the Separate Servers Utilized for Redundancy"; U.S. patent application Ser. No. 10/347,009, filed Jan. 17, 2003, and entitled, "A Method for Shortening the Resynchronization Time Following Failure in a Computer System Utilizing Separate Servers for Redundancy"; U.S. patent application Ser. No. 10/346,456, filed Jan. 17, 2003, and entitled, "A Method for Obtaining Higher Throughput in a Computer System Utilizing a Clustered Systems Manager"; U.S. patent application Ser. No. 10/346,411, filed Jan. 17, 2003, and entitled, "A Method for Distributing the Processing Among Multiple Synchronization Paths in a Computer System Utilizing Separate Servers for Redundancy"; and U.S. patent application Ser. No. 10/346,422, filed Jan. 17, 2003, and entitled, "A Method for a Controlled Fail-Over on a Clustered Computer Systems Manager Using Separate Servers for Redundancy" are commonly assigned co-pending applications incorporated herein by reference.

BACKGROUND OF THE INVENTION

1. Field of the Invention

The present invention generally relates to data processing systems and more particularly relates to data processing system architectures which are arranged in a cluster/lock processing configuration having redundant hardware controlled by software to recover from system component failures without host computers having direct recovery responsibility.

2. Description of the Prior Art

It is known in the prior art to increase the computational capacity of a data processing system through enhancements to an instruction processor. It is also known that enhancements to instruction processors become extremely costly to design and implement. Because such enhancements tend to render the resulting system special purpose in nature, the quantities of such enhanced processors needed within the market place is quite small, thus tending to further increase per unit costs.

An early approach to solving this problem was the "super-computer" architecture of the 60's, 70's, and 80's. Using this technique, a single (or small number of) very large capacity instruction processor(s) is surrounded by a relatively large number of peripheral processors. The large capacity instruction processor is more fully utilized through the work of the peripheral processors which queue tasks and data and prepare needed output. In this way, the large capacity instruction processor does not waste its time doing the more mundane input/output and conversion tasks.

This approach was found to have numerous problems. Reliability tended to rest solely on the reliability of the large capacity instruction processor, because the peripheral processors could not provide efficient processing without it. On the other hand, at least some of the peripheral processors are needed to provide the large capacity instruction processor with its only input/output interfaces. The super computer approach is also very costly, because performance rests on the ability to design and build the uniquely large capacity instruction processor.

An alternative to increasing computational capacity is the employment of a plurality of instruction processors into the same operational system. This approach has the advantage of generally increasing the number of instruction processors in the market place, thereby increasing utilization volumes. It is further advantageous that such an approach tends to utilize redundant components, so that greater reliability can be achieved through appropriate coupling of components.

However, it is extremely difficult to create architectures which employ a relatively large number of instruction processors. Typical problems involve: non-parallel problems which cannot be divided amongst multiple instruction processors; horrendous management problems which can actually slow throughput because of excessive contention for commonly used system resources; and system viability issues arising because of the large number of system components which can contribute to failures that may be propagated throughout the system. Thus, it can be seen that such a system can decrease system performance while simultaneously increasing system cost.

An effective solution is the technique known as the "cluster/lock processing system", such as the XPC (Extended Processing Complex) available from Unisys Corporation and described in U.S. Pat. No. 5,940,826, entitled "Dual XPCs for Disaster Recovery in Multi-Host Environments", which is incorporated herein by reference. This technique utilizes the XPC with a relatively large number of instruction processors which are "clustered" about various shared resources. Tasking and management tends to be decentralized with the clustered processors having shared responsibilities. Maximal redundancy is utilized to enhance reliability.

Though a substantial advance, the cluster/lock systems tend to solve the reliability problems but remain relatively costly to implement, because virtually all of the hardware and firmware are specifically designed and manufactured for the cluster/lock architecture. This is necessary to enable each of the system components to effectively contribute to system reliability, system management, and system viability As a result, demand volumes remain relatively low. Furthermore, the logic necessary to provide component failure recovery tends to be implemented within special purpose hardware and firmware, thereby further exacerbating the problems associated with low volume production. Also, host computers and users may need modification to accommodate the reliability schemes of the cluster/lock processing system.

SUMMARY OF THE INVENTION

The present invention overcomes the disadvantages of the prior art by providing a technique which incorporates the system recovery logic of the cluster/lock processing system within software operating within redundant servers. Preferably, these redundant servers are operating in a "master/slave" relationship and are controlled by a readily available operating system, such as Windows. Thus, the failure recovery software is simply an application within each server which operates under that standard operating system. Therefore, the cluster/lock processing system is able to recover from the most significant of system failures (i.e., loss of a cluster lock server) without any need for specialized processing by host computers or users.

The preferred mode of the present invention is incorporated into a system with a relatively large number of low cost instruction processors providing an extremely high performance, high reliability, relatively low cost cluster/lock system. The low cost is largely achieved by utilizing "commodity" hardware and operating system software for the large numbers of instruction processors. In this sense, a "commodity" system component is one which is designed for and marketed to the general public. For example, in the preferred mode of the present invention, each of the large number of instruction processors is essentially an industry compatible personal computer chip available from Intel Corporation, similar to that found in many "high-end" home computers. Similarly, these instruction processors employ a commonly available operating system, such as a current version of "Windows" available from Microsoft Corporation.

As is well known, these commodity components, though relatively inexpensive because of the high production volumes, do not have the reliability features found in the more specialized hardware and software typically utilized for commercial, industrial, and defense applications. In fact, most home computer users are well aware of and simply learn to live with the reliability problems well known to exist in these commodity systems. Unlike previous cluster processing systems, the approach of the present invention does not incur the expense of upgrading these commodity components, but utilizes them as they exist in the market place.

Because the commodity components employed do not meet the desired levels of reliability, etc., virtually all system management, system reliability, and system viability responsibility is assigned to a centralized entity called the "cluster lock server". This server is not specifically developed for the present system, but already exists in the market place and is currently available to commercial and industrial users. In the preferred mode of practicing the present invention, the cluster lock server is a Cellular Multiprocessing (CMP) architecture System available from Unisys Corporation. The cluster lock servers are preferably employed in tandem for recovery from single point failures.

The cluster lock server hardware employs a set of software representatively called a "cluster lock manager" (CLM). This software is a component that communicates with each of the hosts and can assume the role of either master or slave. In the role of master, it receives and processes a host request for a database lock, read or write to cache, or inter-host message. It then informs any slave CLM of all memory updates resulting from the request and returns status to the requesting host. When in the role of slave, the CLM routes any request it receives directly from a host to the master CLM, accepts and performs all memory updates from the master CLM for each host request, and returns status to a host if the request was received directly by the slave CLM from a host.

As a result of the innovative architecture of the preferred mode of the present invention, extremely large processing capacity computer systems are clustered together using only off-the-shelf hardware and software with the addition of cluster lock manager software. Therefore, hardware and software costs are extremely low in view of the cluster lock processing system's processing capacity. These advantages accrue as a result of an architecture which employs cluster/lock processing, large scale caching, and direct mass storage accessing within a single platform. This provides reduced cost by eliminating the requirement to have two hardware platforms (i.e., one for data base locking/caching and one to perform I/O). A second advantage of the architecture is that it reduces needed connectivity. The number of connections required to support two separate platforms is eliminated. System overhead is further reduced because it is no longer needed to accelerate/decelerate cached I/O data to provide an interface between two different platforms.

The primary capability for recovery from system component failures resides in the redundant cluster lock servers. In the prior art systems, this functionality was provided in proprietary hardware and firmware. In accordance with the present invention, multiple redundant cluster lock servers, each operating under a commonly available operating system such as Windows, have software applications which implement the logic required for system recovery from component failures. The multiple redundant cluster lock servers are arranged through control of the redundancy recovery software such that only one is serving in the master role at any one time. The failure of this master platform must result in a switch over of functionality to a redundant server previously functioning in a slave role. Thus, the system must ensure that precisely one cluster lock server is always serving in the master role.

The cluster/lock functionality as required by each host is provided by the cluster/lock service program that is running on the platform currently serving as master. The locking, caching, and inter-host messaging requests originating from each host are indiscriminately directed to either the master or slave platforms. This is because the hosts view the master and slave platforms as a single cluster/lock processing system. With no awareness by the host software, requests received by the slave platform are routed by the service program running in the slave mode through a crossover path to the master platform.

The service running on the master grants the requested lock, performs the read or write to cache, or routes the requested inter-host message. The master then sends the memory updates required by the operation to the slave and reports the status for the request back to the requesting host. In this manner, the slave platform has all the information necessary to assume the role of master, should a failure occur, with retention of all the locks, cached data, and pending messages as requested by the hosts.

The master and slave platforms, as well as the hosts, can be placed at different geographical sites in order to provide protection from a site disaster. When the cluster/lock service program running on the slave can no longer communicate with its counterpart on the master, it cannot simply assume that the master platform has failed and take on the role of master. The loss of response from the master platform could, in fact be caused by the loss of all of the interfaces between the master and slave and between the hosts rather than by the total loss of the site on which it resides. The master could still be operating properly and servicing requests from hosts that have a direct connection to it. The slave cannot begin to service requests from its directly connected hosts without the intervention of a "third party" (i.e., XPC control) that can ensure that only one platform is serving as master. It is imperative that only one platform assume the role of master at any given time. This is so, because locking and caching operations, due to their very nature, must be provided by a single source to ensure data integrity.

The XPC Control program communicates with each (master and slave) XPC service program and with any redundant XPC Control PC through a local area network (LAN) that can also be made redundant. In order to ensure that there is only one master, the XPC service program can be started only by XPC Control through a service request and the XPC service program waits to receive its role as master or slave from the XPC Control program. Most importantly, an XPC service program running in slave mode will not assume the role of master without confirming via XPC Control that it can assume the role of master. Because XPC Control communicates with both master and slave through LAN interfaces that are independent of any other interface used by the XPC platforms, it can verify that the previous master platform is no longer in operations.

Because each cluster lock server contains software permitting recovery from loss of another cluster lock server, there is no need for host computers to be aware of or compensate for loss of a cluster lock server. Each host computer has redundant interfaces with each of the cluster lock servers. Should a particular interface time out, the host computer simply utilizes a different interface without regard to whether any particular cluster lock server is or is not operable.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention is described in accordance with several preferred embodiments which are to be viewed as illustrative without being limiting. These preferred embodiments are based upon mainframe hardware components and various operating system software components available from Unisys Corporation and commodity hardware and software components available from Microsoft Corporation, Intel Corporation, and in the general personal computer market place.

Figure 1:
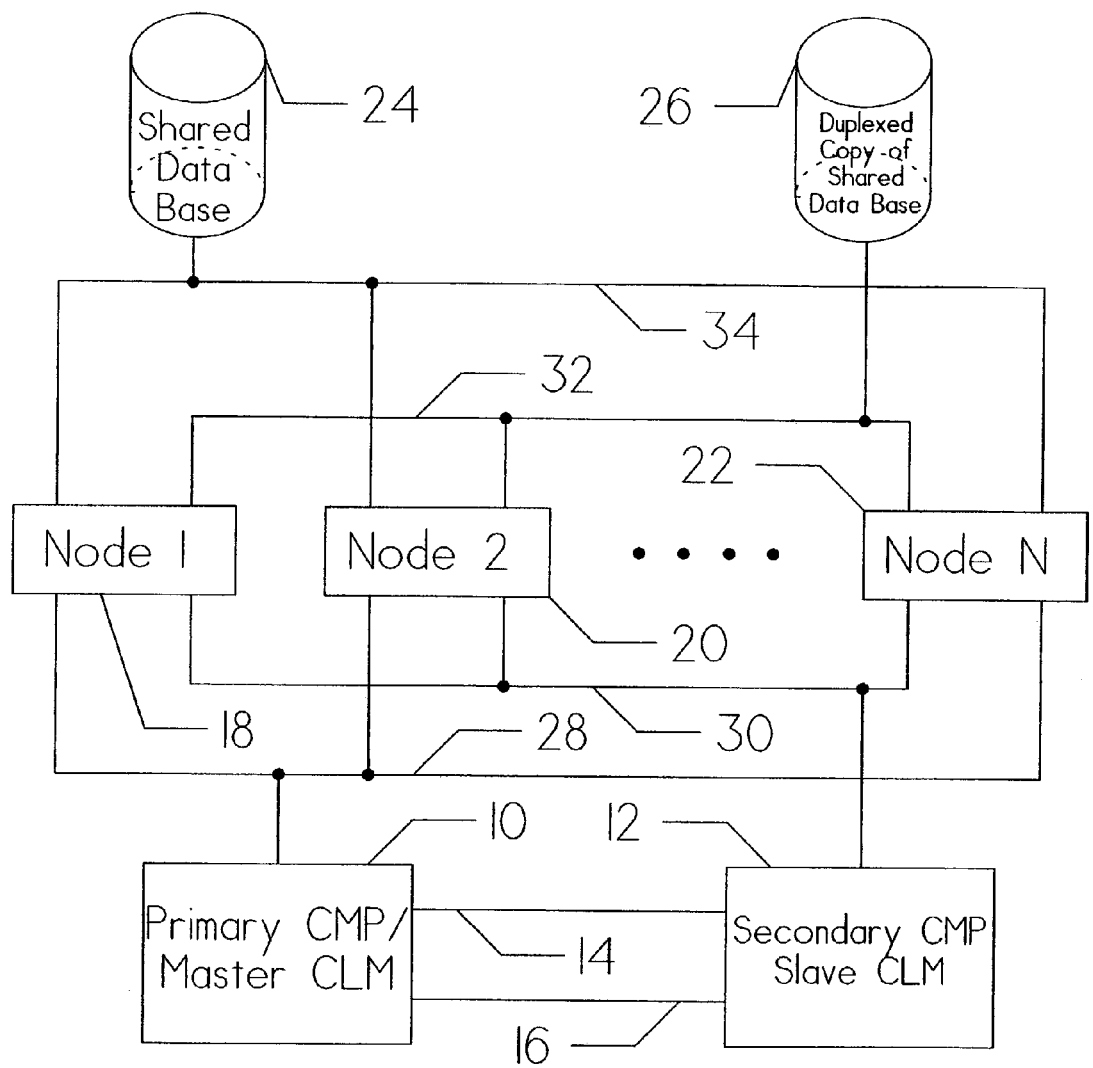
FIG. 1 is detailed block diagram showing a generalized clustered computer system in accordance with the present invention.

FIG. 1 is a detailed diagram showing the general relationship of the clustered hardware components that comprise a clustered computer system. The host systems are represented by Node 1 (18), Node 2 (20), and Node N (22). The total number of host systems is selected for the particular system application(s). Each of these instruction processors communicate with Data Base 24 and Duplex Copy 26 of Data Base 24 via busses 34 and 32, respectively. This provides the redundancy necessary to recover from single point of failures within the data base.

In addition to the interface with the data base and its duplicate copy, the host systems can communicate only with Primary CLS (Cluster Lock Server) 10 and Secondary CLS 12 via busses 28 and 30, respectively. Redundant connections to redundant cluster lock servers ensures that single point control structure failures can also be accommodated. Because the sole interface between the host systems (i.e., Nodes 1, 2, . . . N) is with the Primary CLS and Secondary CLS, all services to be provided to an individual host system must be provided by the Primary CLS or Secondary CLS. The primary services provided include: 1) services to synchronize updates to one or more shared databases; 2) services to facilitate inter-node communication; 3) services to provide for shared data among the nodes; 4) services to detect failing nodes in the cluster; and 5) duplication of all information contained in the Primary Cluster Lock Server.

Services provided for synchronization of database updates assume all nodes in the cluster use the same locking protocol. The Cluster Lock Manager (CLM) is the "keeper" of all locks for shared data. The locking functionality includes: 1) ability for any node to request and release database locks; 2) ability to support multiple locking protocols; 3) asynchronous notification to the appropriate node when a lock has been granted; 4) automatic deadlock detection including the ability to asynchronously notify the nodes owning the locks that are deadlocked; and 5) support for two-phase commit processing including holding locks in the "ready" state across recoveries of individual nodes.

Inter-node communication services provide the capability for any node to send messages to and receive messages from any other node in the cluster. The ability for a node to broadcast to all other nodes is also provided.

Shared data services provide the capability for the nodes to share the common data structures required to facilitate the management and coordination of the shared processing environment. This data is maintained within the CLM.

Failed node detection services include heartbeat capability, the ability to move in-progress transactions from a failed node onto other nodes and the ability to isolate the failed node.

Although not required to practice the invention, in the preferred mode, the cluster lock processing system is composed of a primary/secondary cluster lock server and a master/slave cluster lock manager. The nodes communicate with either the master or the slave with each ensuring all data is duplicated in the other. The ability of a node to communicate with either the master or the slave at any time increases resiliency and availability as the loss of the physical connection from the node to either the master or the slave does not effect the nodes's ability to continue operating. The master is responsible for control and heartbeat functions. The ability to manually switch from the master to the slave is also provided in the preferred mode. Manual switching facilitates testing and maintenance. Of course, automatic switching occurs upon failure of the master CLM.

Figure 2:
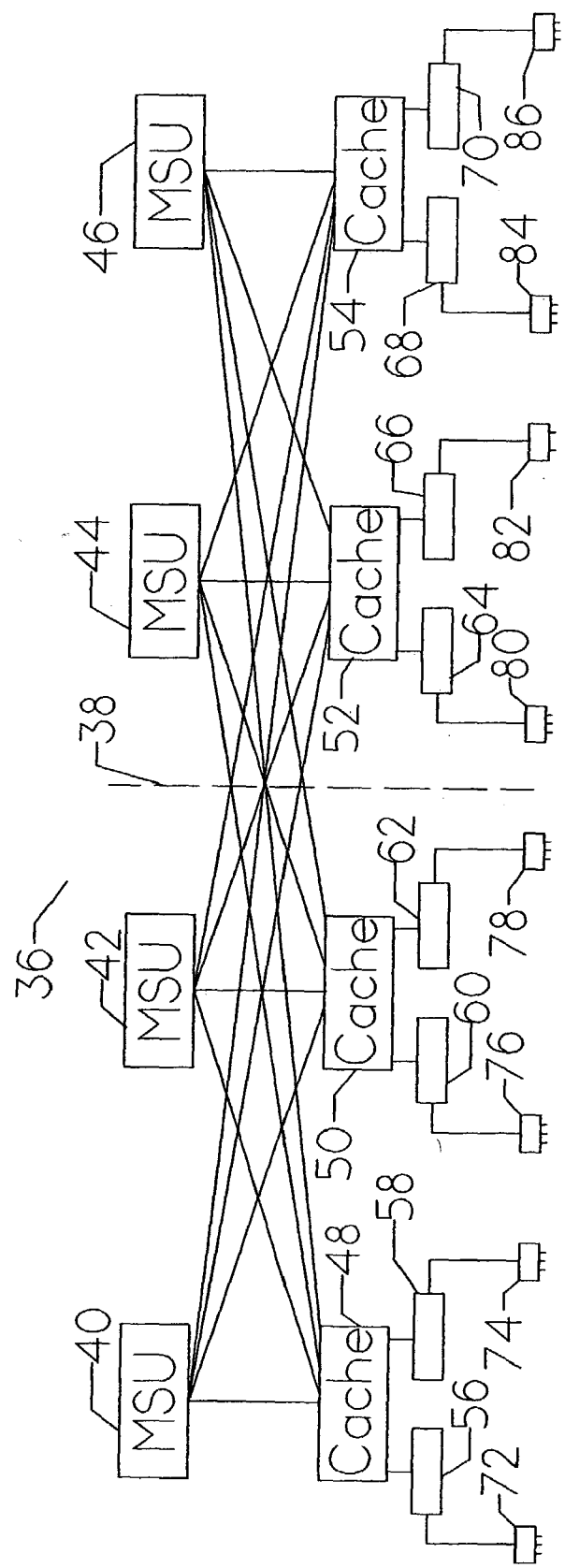
FIG. 2 is a detailed diagram showing the architecture of the cluster lock server.

FIG. 2 is a detailed block diagram 36 of a fully populated ES7000 Cellular Multi-Processor (CMP) system available from Unisys Corporation. Each of Primary CLS 10 (see FIG. 1) and Secondary CLS 12 (see FIG. 1) consists of one of these computers. The ES7000 CMP is a commercially available product available from Unisys Corporation now on the market. One key advantage of this computer is that it makes the cluster lock server inherently scalable. It should be readily apparent that the total processing load on a cluster lock server increases directly with the number of cluster instruction processors which are directly managed by that cluster lock server. Thus, it is of substantial value that a readily scalable processor is utilized for this purpose. It is further assumed that the cluster lock server has the inherent reliability (e.g., failure recovery) and system viability (e.g., memory and shared resource protection) functionality to assume responsibility for these aspects of the system's operation.

A fully populated CMP contains up to four main memory storage units, MSU 40, MSU 42, MSU 44, and MSU 46. These are interfaced as shown through up to four cache memory systems, Cache 48, Cache 50, Cache 52, and Cache 54. Each of subpods 56, 58, 60, 62, 64, 66, 68, and 70 contains up to four instruction processors, each having its own dedicated cache memories. Duplexed input/output processors 72, 74, 76, 78, 80, 82, 84, and 86 interface with the commodity instruction processors (see FIG. 1), with other cluster lock server(s), and with host computers (see below). Thus, each of the cluster lock servers (i.e., Primary CLS 10 and Secondary CLS 12, see FIG. 1) preferably consists of an ES7000 CMP having from one to four MSU's, one to four Cache's, one to eight subpods, and one to eight duplexed input/output processors.

To further enhance reliability, and already a part of the ES7000 CMP system, various of the components are separately powered. In accordance with the fully populated system of block diagram 36, all components left of line 38 are powered by a first power source (not shown) and all components right of line 38 are powered by a second power source (not shown). In this manner, the system remains viable even during the course of a single power source failure.

Figure 3:
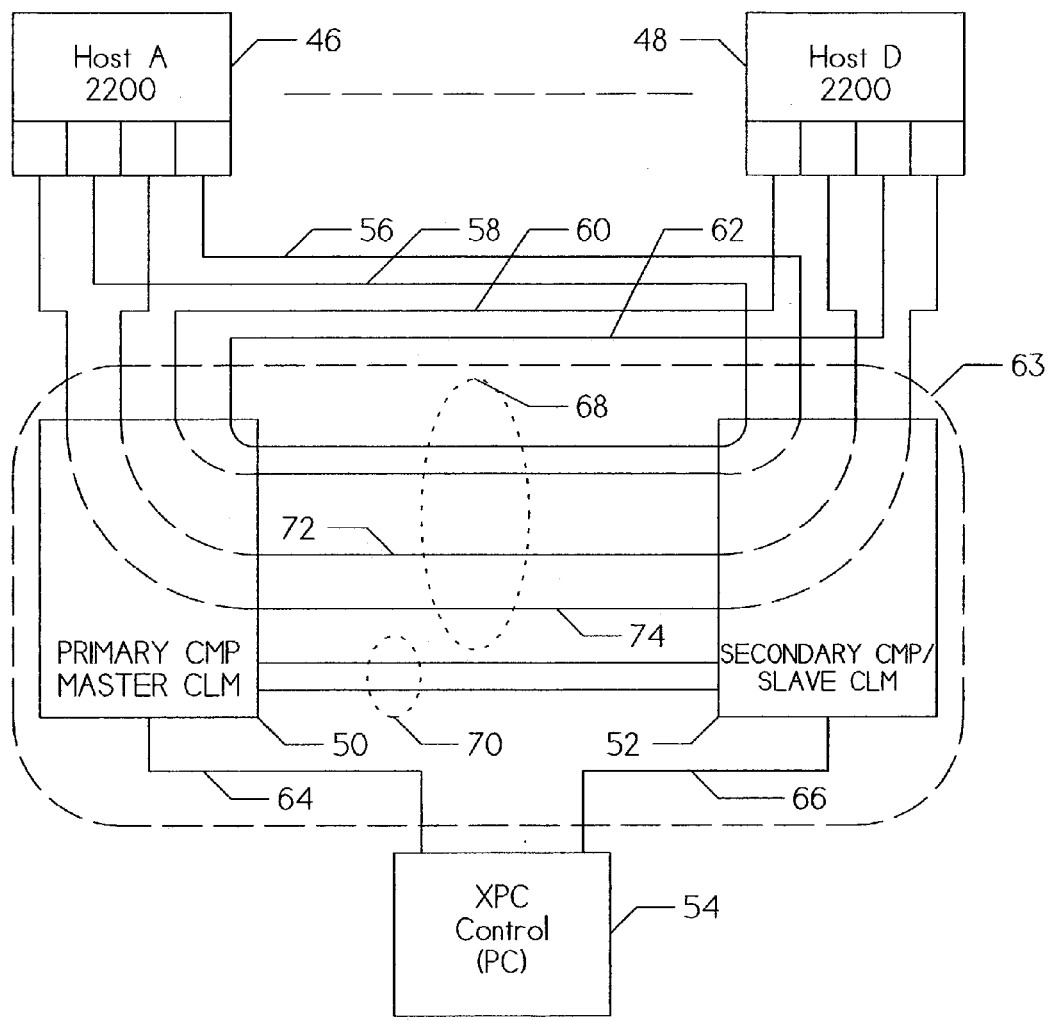
FIG. 3 is a detailed schematic diagram showing data flow paths within the overall system of the present invention.

FIG. 3 is a detailed block diagram showing implementation of the cluster processing system (XPC) 63 of the present invention within a practical configuration for high capacity and high reliability data processing. The major components include Primary CMP/Master CLM 50 and Secondary CMP/Slave CLM 52 and connections 68, 70 between them. The actual clustered instruction processors (i.e., Nodes 1–N) are not separately shown except through their interface with the XPC. XPC control 54 is a personal computer implemented as control console which interfaces with the XPC via intercomputer paths 64 and 66.

The "external world" is shown as Host A 46 through Host D 48, which are coupled to the XPC via intercomputer paths 56, 58, 60, and 62. The host computers are preferably Clearpath Plus (2200 based) mainframe computers available from Unisys Corporation. The paths are arranged to provide completely redundant paths amongst all major components. Paths 68 are the Primary/Secondary crossover paths wherein paths 72 and 74 are redundant request/status packet routing paths. Paths 70 are the Primary/Secondary synchronization paths.

A typical exchange between the host computers 46 and 48 and the XPC 63 further helps to illustrate the overall system operation. The Host D 48 issues a request via intercomputer path 60. The Master CLM 50 processes the request and generates an SRR packet 84 (see FIG. 5) containing audit data that is routed to the Slave CLM 52 via one of the Synchronization Paths 70. The Slave CLM 52 receives the SRR packet 84 via one of the Synchronization Paths 70, performs the data updates defined in the SRR packet 84 and sends an SRR packet 84 containing 'audit updates completed' on the same Synchronization Path. The Master CLM 50 receives the SRR packet 84 containing the 'audit updates completed' and completes the request by sending a status packet to Host D 48 via intercomputer path 60.

Figure 4:
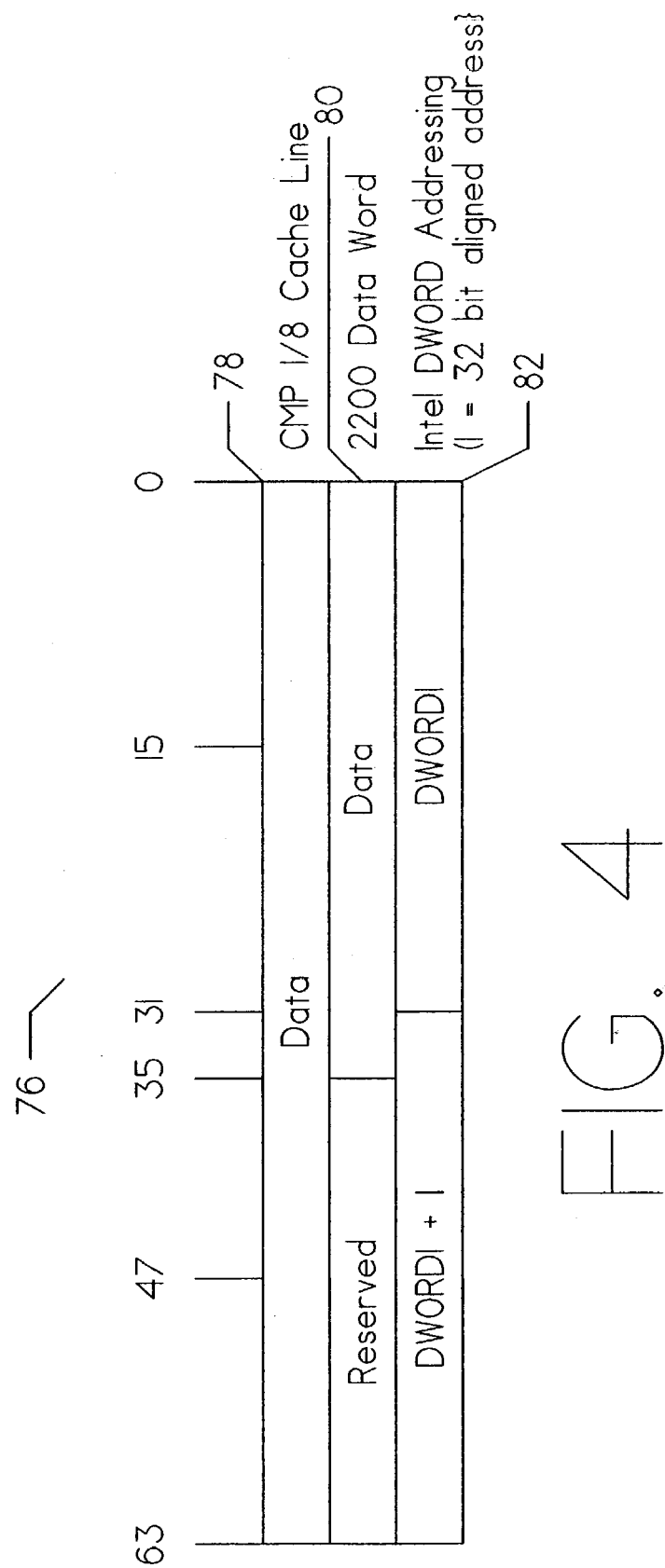
FIG. 4 is a diagram showing the format of data transfers between the commodity processors and the host computers.

FIG. 4 is a detailed diagram 76 showing the format for data conversion between the XPC 63 with Host A through Host D. Host A through Host D, being ClearPath Plus (OS 2200 based) mainframes from Unisys Corporation, have a basic 36 bit word internal format, whereas the XPC is basically byte oriented with 16 bit, 32 bit, and 64 bit words. A 64 bit data word 78 corresponds to a 36 bit 2200 data word 80, and two 32 bit Intel DWORD's 82.

Figure 5:
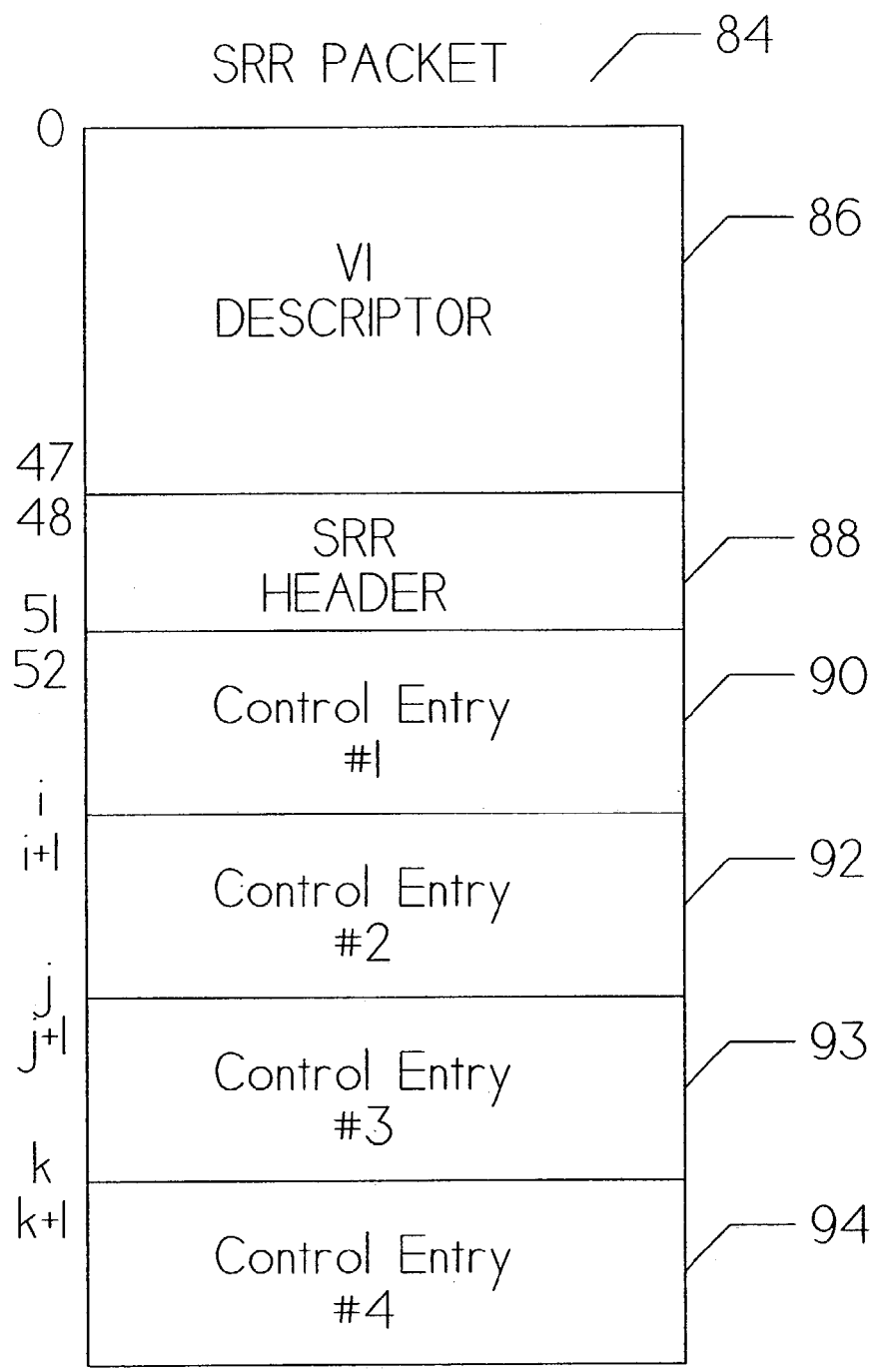
FIG. 5 shows the format of the Synchronization path Request/Response (SRR) packet.

FIG. 5 is a diagram 84 showing the format of a Synchronization path Request/Response (SRR) packet. Though the SRR packets are primarily used to convey audit data from master to slave, they are also used to implement the master/slave control functions. The first 48 words contain Descriptor 86. This is followed by Header 88. A number of control entries (i.e., Control Entry #1 90, Control Entry #2 92, Control Entry #3 93, and Control Entry #4 94) provide the actual control information. Each of the control entries has a variable length depending upon the function to be performed, as explained below.

Figure 6:
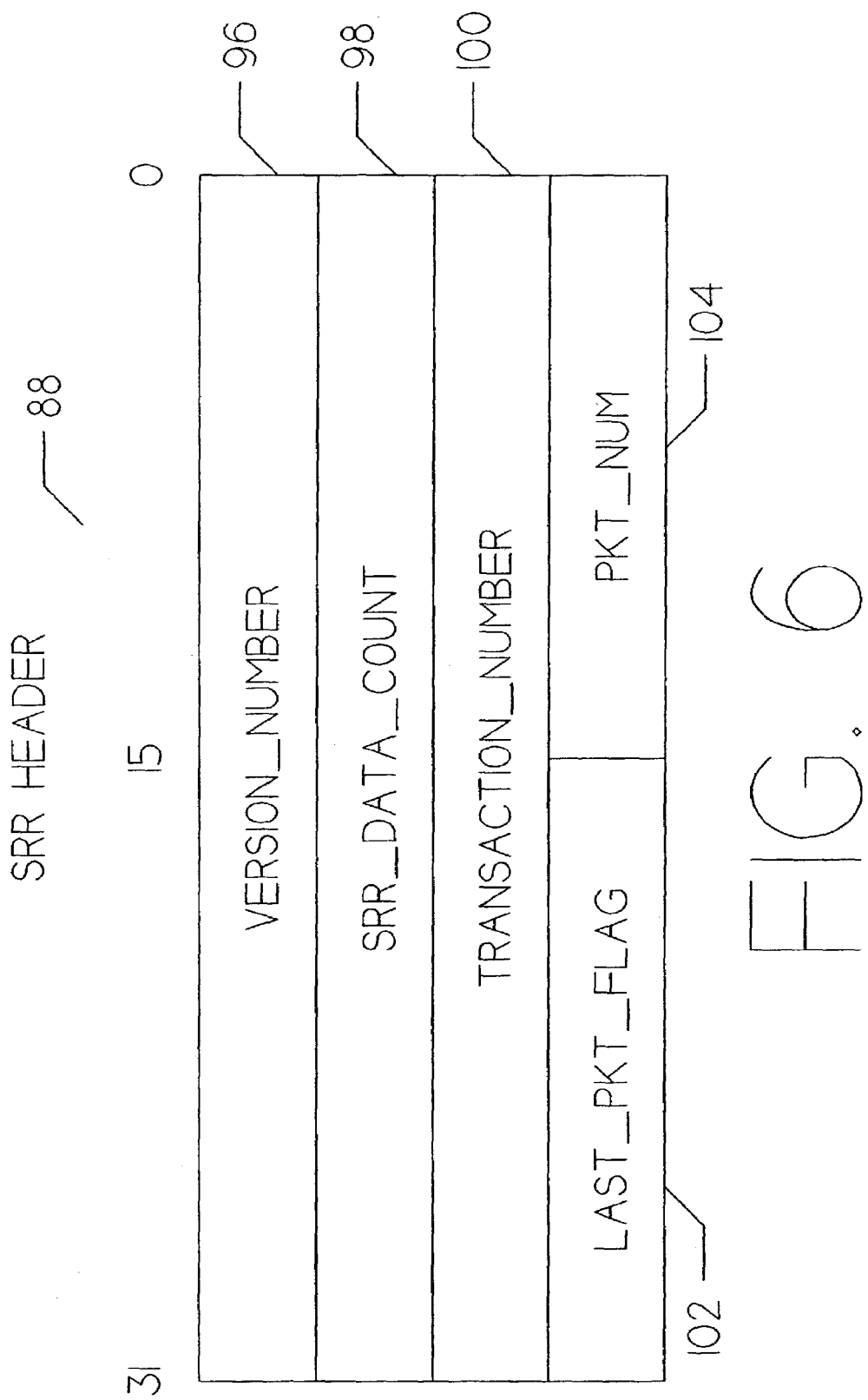
FIG. 6 is diagram showing the format of the SRR packet header.

FIG. 6 is a diagram showing the format of SRR header 88. The first 32 bit word contains version number 96, which describes the version number of the service running on the platform. This is used to determine whether services running on primary/secondary platforms are compatible.

This is followed by SRR data count 98, indicating the number of 32 bit words within the SRR packet, and transaction number 100. The last 32 bit word of the fixed length SRR header 88 contains Last Packet Flag 102, which indicates that the current packet is the last packet of an audit sequence and Packet Number 104. If Last Packet Flag 102 is set and Packet Number 104 is equal to 1, the current SRR packet is the only packet in the audit sequence.

Figure 7:
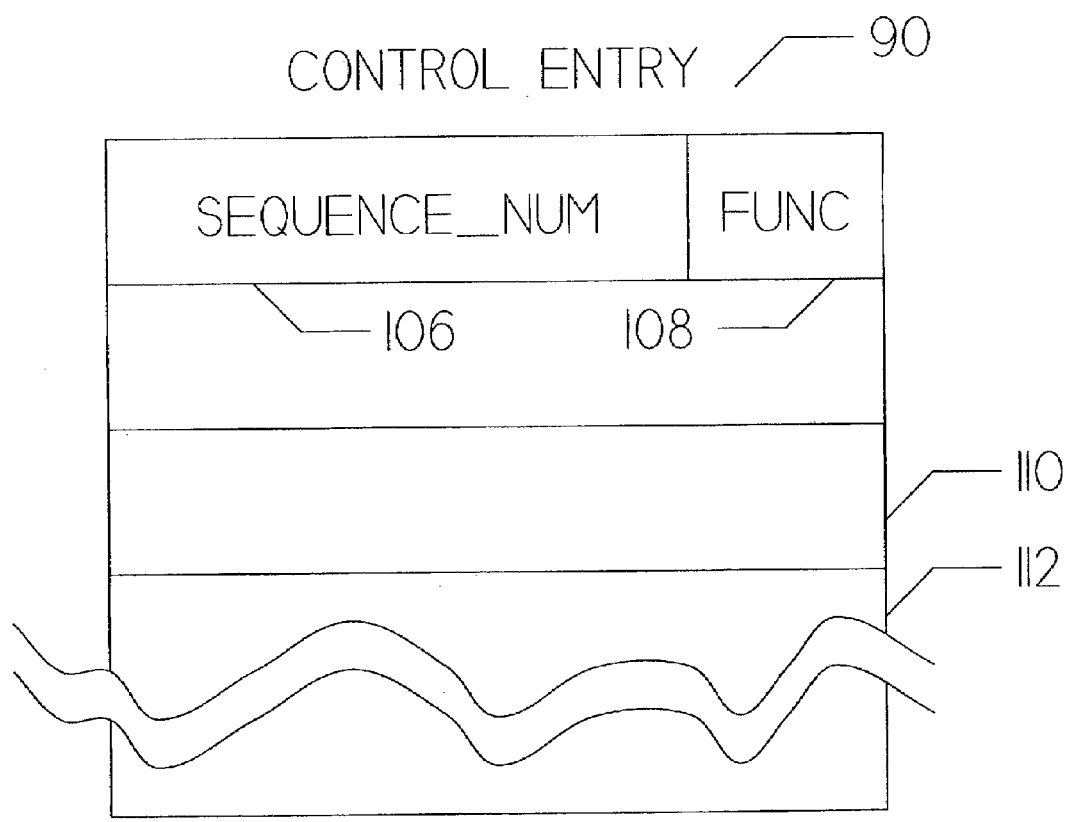
FIG. 7 is a diagram showing the format of a control entry.

FIG. 7 is a diagram showing the format of control entry 90. Sequence Number 106 is available to keep track of the specific control entry. Function 108 determines the length of the control entry, because it determines the number of 32 bit words 110–112 required to define the function.

The function code is an 8 bit number which decodes into 256 different numbers. Values 0, 7–16, and 33–255 are defined as invalid. The remaining defined function codes are as follows:

1—Write Audit Data;
2.—Audit Updates Completed;
3.—Resend Audit Data;
4.—Abort Audit Updates;
5.—Audit Request Accepted;
6—Audit Request Rejected;
17—Heartbeat;
18—Probe Path Identification;
19—Path Identification;
20—Query Memory Size;
21—Return Memory Size;
22—Set Memory Size;
23—Transfer Coherent Memory;
24—Coherent Memory Transfer Completed;
25—Up/Down Path;
26—Switch State Pending;
27—Switch Master/Slave State;
28—Commit State Change;
29—Request permission to become active;
30—Terminate Service Request;
31—Positive Acknowledge; and
32—Negative Acknowledge.

Figure 8:
FIG. 8 is a memory allocation table for the cluster lock processing system.

FIG. 8 is a table showing structures that are allocated in memory as made by the XPC.

Figure 9:
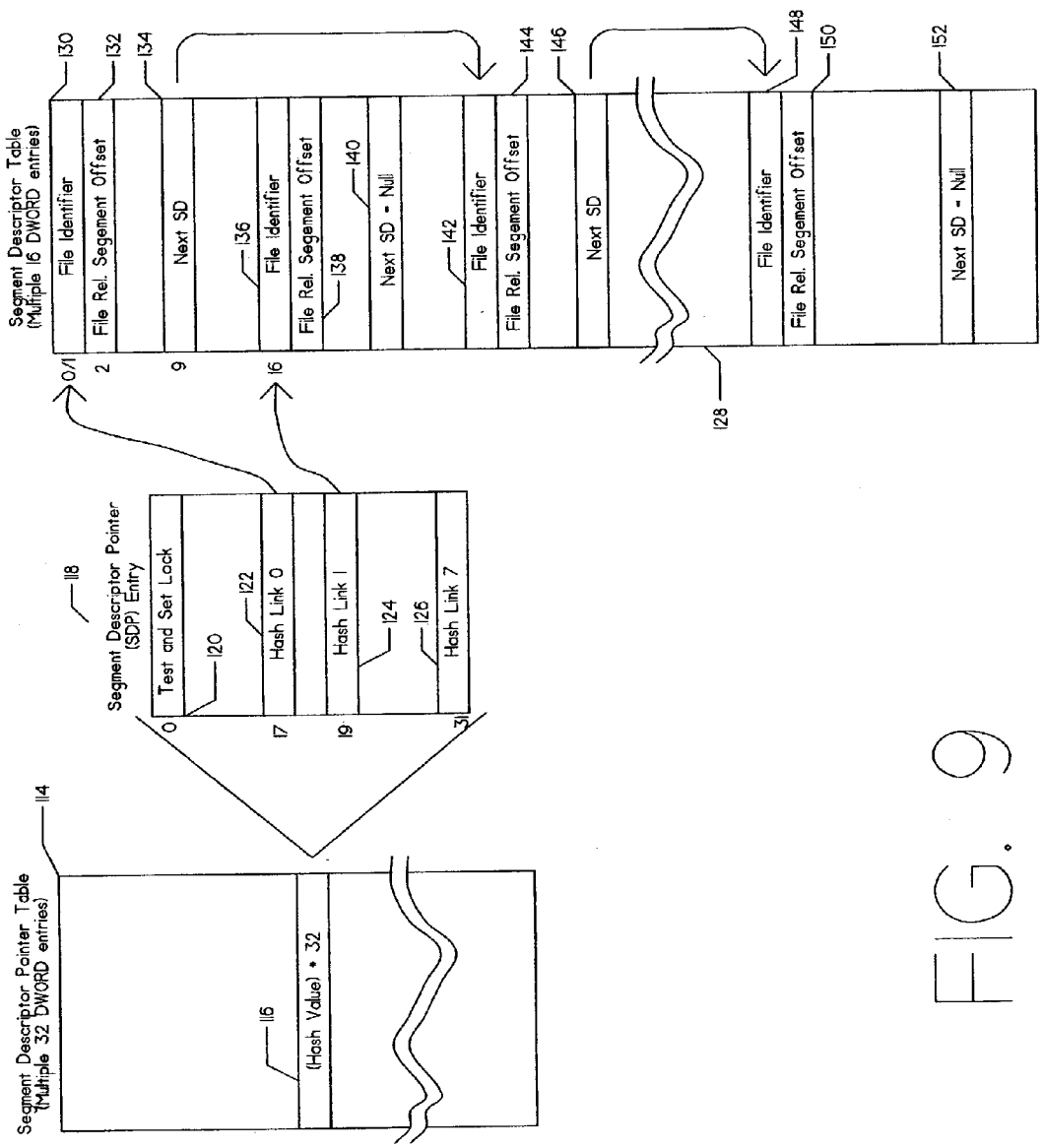
FIG. 9 is a detailed diagram showing operation of the segment descriptors.

FIG. 9 is a detailed diagram showing segment descriptor accessing. Segment Descriptor Pointer Table 114 consists of multiple 32-bit unsigned integer entries. Example 116 is an entry having hash value=32 which points to Segment Descriptor Pointer (SCP) Entry 118.

Segment Descriptor Pointer Entry 118 consists of 32 words of 32 bits each. The first word is the test and set lock which is used to control access to the segment descriptors that hash to this entry. The remaining words point to up to eight entries within the Segment Descriptor Table, consisting of multiple 32-bit unsigned integers. Word 17 of Segment Descriptor Pointer Entry 116 is hash link 0 (122), word 19 is hash link 1 (124), and word 31 is hash link 7 (126).

The file name associated with hash link 0 is File Identifier 130 occupying the first two words of the Segment Descriptor Table. The corresponding File Relative Segment Offset 132 is located in the next word. Word 9 is Next Segment Descriptor 134 which points to the next associated segment (i.e., File Identifier 142) as shown.

Similarly, the file name associated with hash link 1 (124) is File Identifier 136. File Relative Segment Offset 138 provides the corresponding relative offset. Because there are no further associated segment descriptors, Next Segment Descriptor 140 is null.

File Relative Segment Offset 144 corresponds to File Identifier 142. Associated therewith is Next Segment Descriptor 146 which points to File Identifier 148, located subsequent to extended area 128. File Relative Segment Offset 150 corresponds thereto. There are no further associated segment descriptors so Next Segment Descriptor 152 is null.

Figure 10:
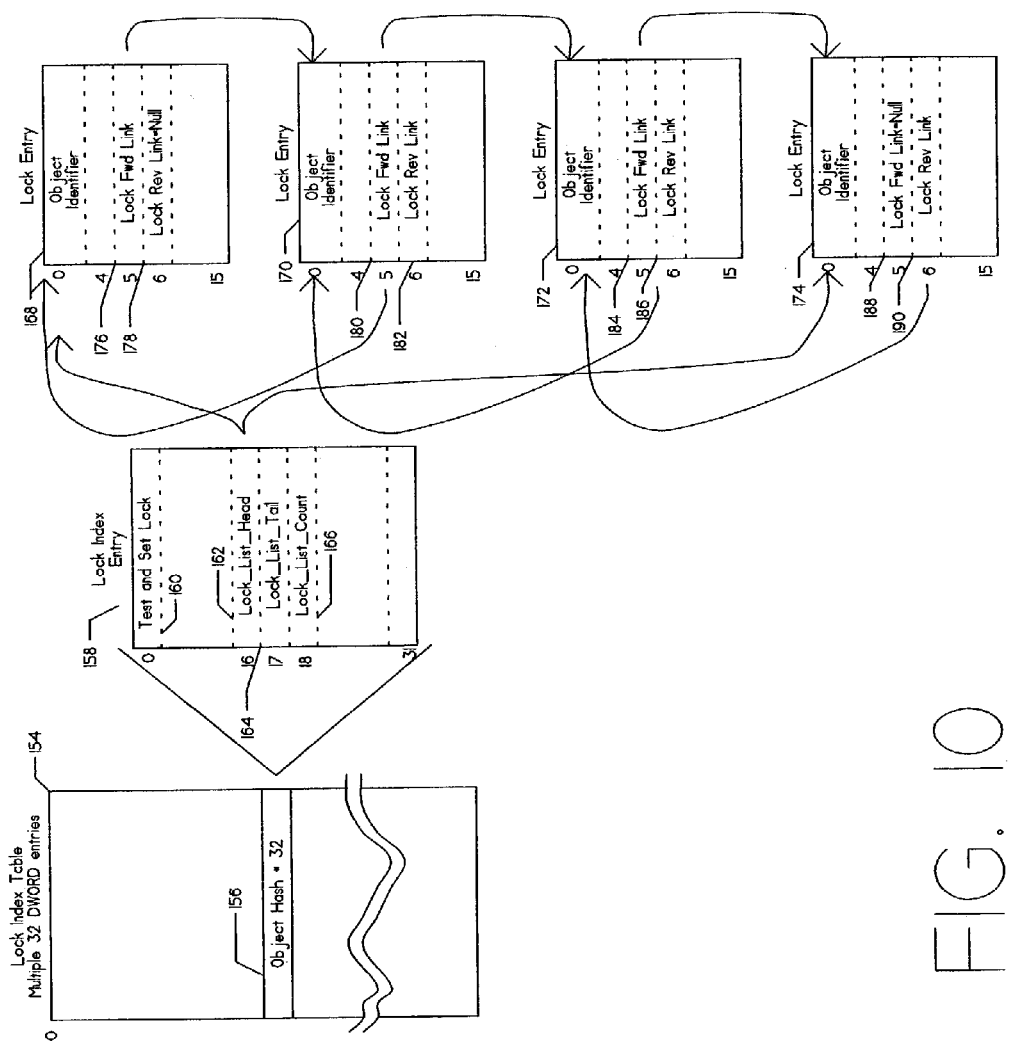
FIG. 10 is a detailed diagram showing operation of the locks.

FIG. 10 is a detailed diagram showing lock entry accessing. It is via this locking system that the XPC (see also FIG. 1) maintains control of the shared database facilities. Lock Index Table consists of multiple 32-bit unsigned integer entries. Example 156 is Object Hast *32 which points to Lock Index Entry 158.

Test and Set Lock 160 occupies the first word of Lock Index Entry 158. It is used to control access to this lock list. Lock_List_Head 162 provides the address of the first lock entry that hashes to this location. Lock_List_Tail 164 supplies the address of the last lock entry that hashes to his location. Lock_List_Count 166 specifies the number of lock entries on this lock list.

Object Identifier 168, 170, 172, and 174, name the actual lock entries for this particular lock list. Lock Forward Links 176, 180, 184, and 188 address the next lock entry in this lock list. Lock Reverse Links 178, 182, 186, and 190 supply the address of the previous lock entry in this lock list. Because it is associated with the first lock entry in the lock list, Lock Reverse Link 178 is Null.

Figure 11:
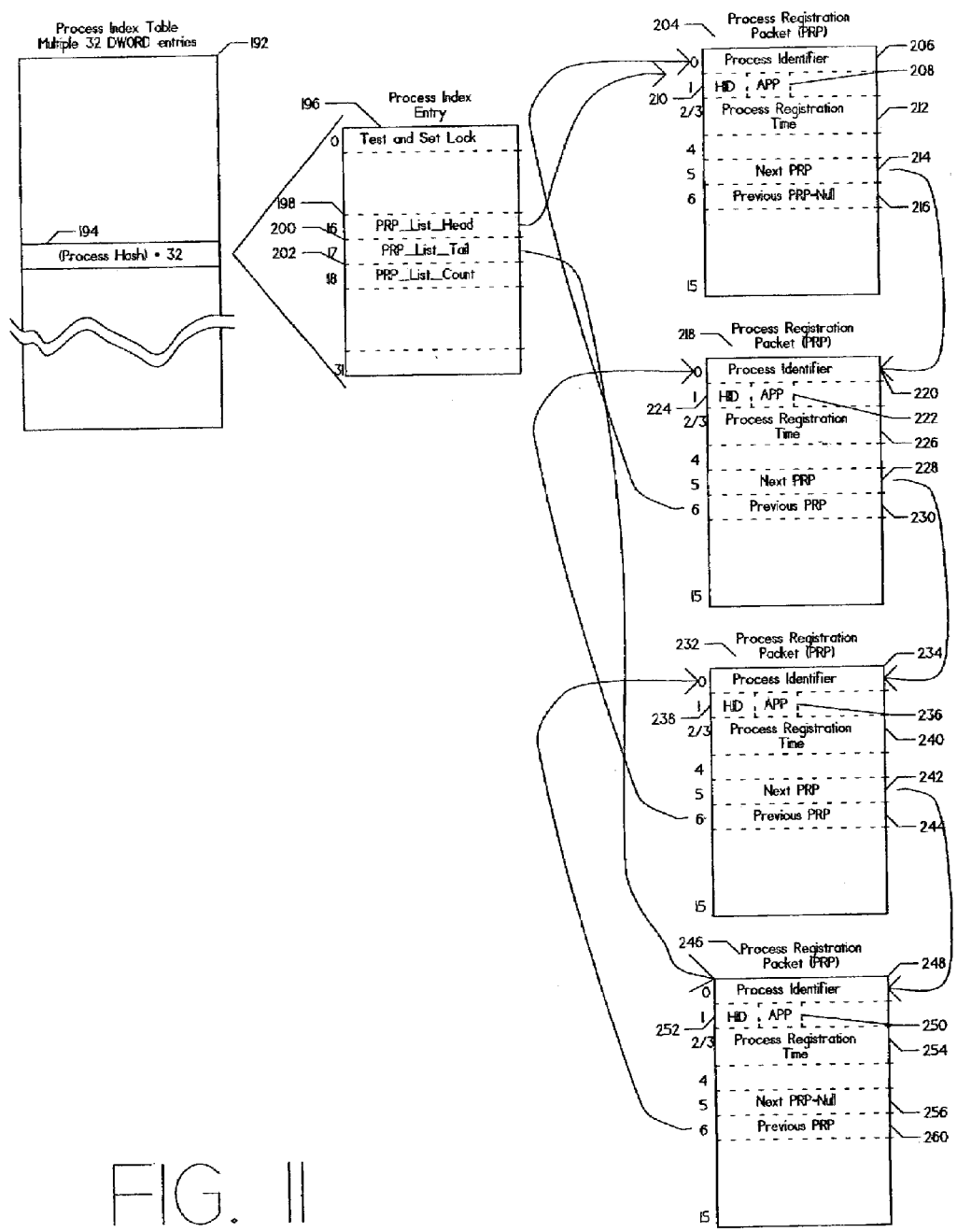
FIG. 11 is a detailed diagram showing operation of processes.

FIG. 11 is a detailed diagram of Process Entry accessing in accordance with the preferred mode of the present invention. Process Index Table 192 consists of multiple 32-bit unsigned integer entries. Sample entry 194 contains process hash *32 which identifies the Process Index Entry shown.

Test and Set Lock 196 is used to control access to this process list. PRP_List_Head 198 addresses the first Process Registration Packet 204 that hashes to this location. PRP_List_Tail 200 supplies the address of the last Process Registration Packet 246 that hashes to this location. PRP_List_Count 202 provides the number of Process Registration Packets on this process list.

Process Registration Packets (PRP) 204, 218, 232, and 246, each consist of 16—32-bit unsigned integers. The first word is Process Identifier 206, 220, 234, and 248, respectively. The second word contains Host Identifier 210, 224, 238, and 252 and Application Identifier 208, 222, 236, and 250, each of which define processing for the corresponding clustered instruction processor.

Process Registration time 212, 226, 240, and 254 is maintained in each of the Process Registration Packets. Part of the time is derived from the Windows operating system time and part from a code-maintained counter, which is sized to assure overall registration time uniqueness.

Next PRP 214, 228, 242, and 256 point to the next Process Registration Packet within the list. Because PRP Packet 246 is the last packet in the list, Next PRP is set to Null. Similarly, Previous PRP 216, 230, 244, and 260 each point to the next previous PRP packet. Because PRP Packet 204 is the first packet in the list, Previous PRP is set to null.

Figure 12:
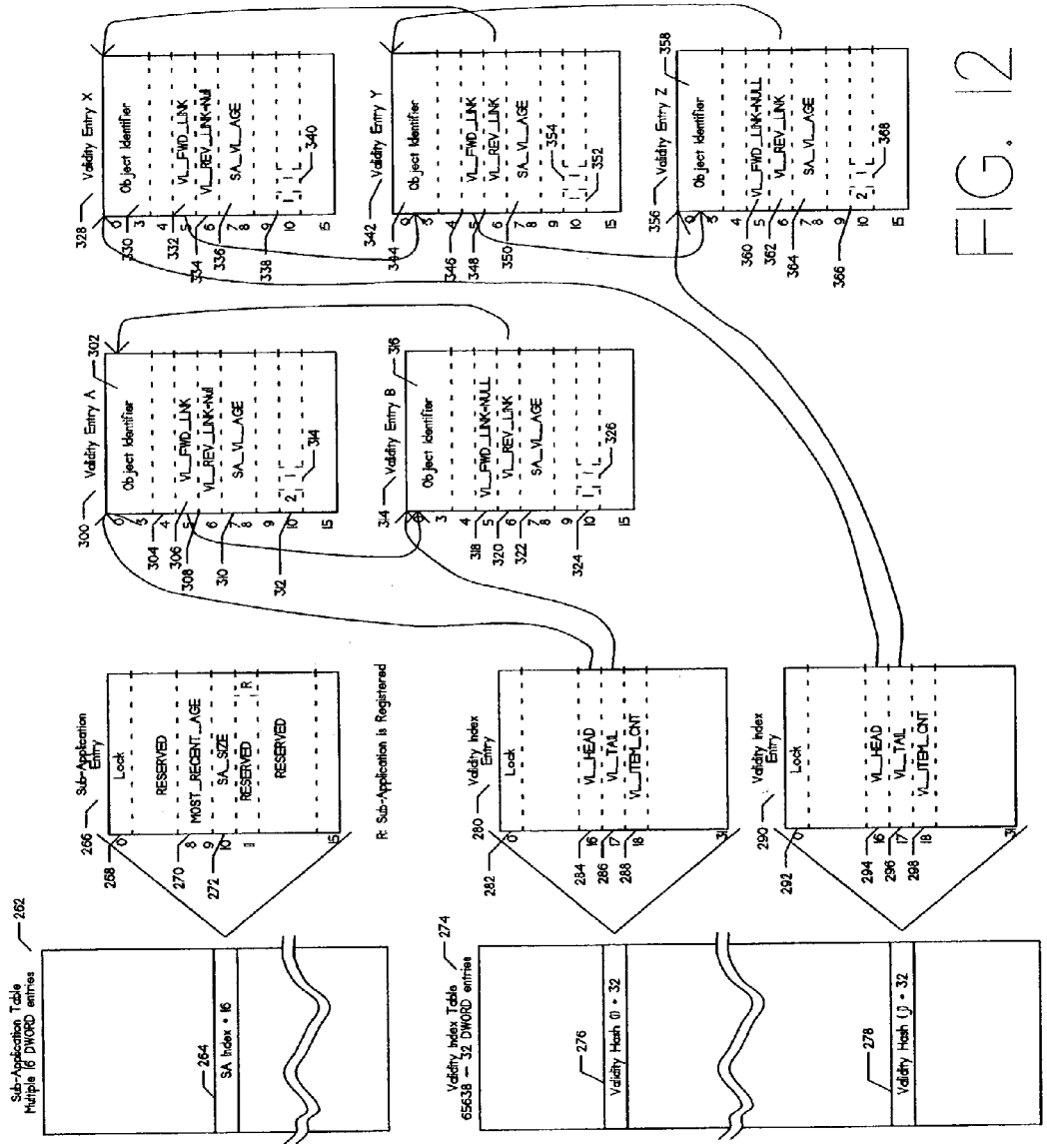
FIG. 12 is a detailed diagram showing operation of sub-applications and validity entries.

FIG. 12 is a detailed view of the Inter-Host Cache (IHC) data structures. Two validity lists are shown in the example, with validity entries for sub-applications 1:1 and 2:1. The sub-application entry is shown for sub-application 1:1, and contains the Most_Recent_Age of validity entries for sub-application 1:1. The Most_Recent_Age is used in conjunction with the sub-application size (SA_SIZE) to implement a MRU/LRU algorithm used to determine if the validity object is within the sub-application cache. Validity list entries which are outside of the LRU limit are removed whenever a validity operation encounters an 'old' entry. This is accomplished via a scan of the entire validity list after status is returned to the host.

In the example, validity list 'i' contains two entries (A and B), one each for sub-application 1:1 and 2:1. Validity list 'j' contains three entries (X, Y and Z), two for sub-application 1:1 and one for sub-application 2:1. The sub-application entry is shown for sub-application 1:1, having a Most_Recent_Age of 683 and SA_Size of 100, yielding a "validity age" range of 584–683. The validity entries in validity list 'j'

(entries X and Y) are both within the range and are therefore within the sub-application cache. However, the validity entry B in validity list 'i' for sub-application 1:1 is not within the range, and is therefore not with in the sub-application cache. The next IHC operation that references validity list 'i' will find and remove the 'aged out' entry.

Sub-Application Table 262 contains multiple 32-bit unsigned integer entries. Entry 254 contains a Sub-Application Index *16 which points to Sub-Application Entry 266. The first word is Test and Set Lock 268 which controls access to the sub-application entry. MOST_RECENT_AGE 270 is the counter value for the most recently accessed validity entry in this sub-application. After its initial value of zero, the only operations allowed on this field are increments. SA_SIZE 272 is the number of validity entries for this sub-application. This is the value as seen by the hosts and not the actual number of validity entries that are on the validity lists.

Validity Index Table 274 contains multiple 32-bit unsigned integer entries. A first sample entry 276 contains Validity Hash (i *32) which points to Validity Index Entry 280. A second sample entry 278 contains Validity Hash (j *32) which points to Validity Index Entry 290.

Validity Index Entry 280 has a Test and Set Lock 282 which is used to control access to this validity list. VL_HEAD 284 supplies the address of the first validity entry (i.e., Validity Entry A 300) that hashes to his location. Similarly, VL_TAIL 286 contains the address of the last validity entry (i.e., Validity Entry B 314) that hashes to this location. VL_ITEM_CNT 288 specifies the number of validity entries on this validity list.

Validity Index Entry 290 has a Test and Set Lock 292 which is used to control access to this validity list. VL_HEAD 294 supplies the address of the first validity entry (i.e., Validity Entry X 328) that hashes to his location. Similarly, VL_TAIL 296 contains the address of the last validity entry (i.e., Validity Entry Z 356) that hashes to this location. VL_ITEM_CNT 298 specifies the number of validity entries on this validity list.

Each of Validity Entries A 300, B 314, X 328, Y 342, and Z 356 contains an Object Identifier (i.e., 302, 316, 330, 344, and 358); a forward link (i.e., VL_FWD_LINK 306, 318, 332, 346, and 360); a reverse link (i.e., VL_REV_LINK 308, 320, 334, 348, and 362); and an age (i.e., SA_VL_AGE 310, 322, 336, 350, and 364).

Figure 13:
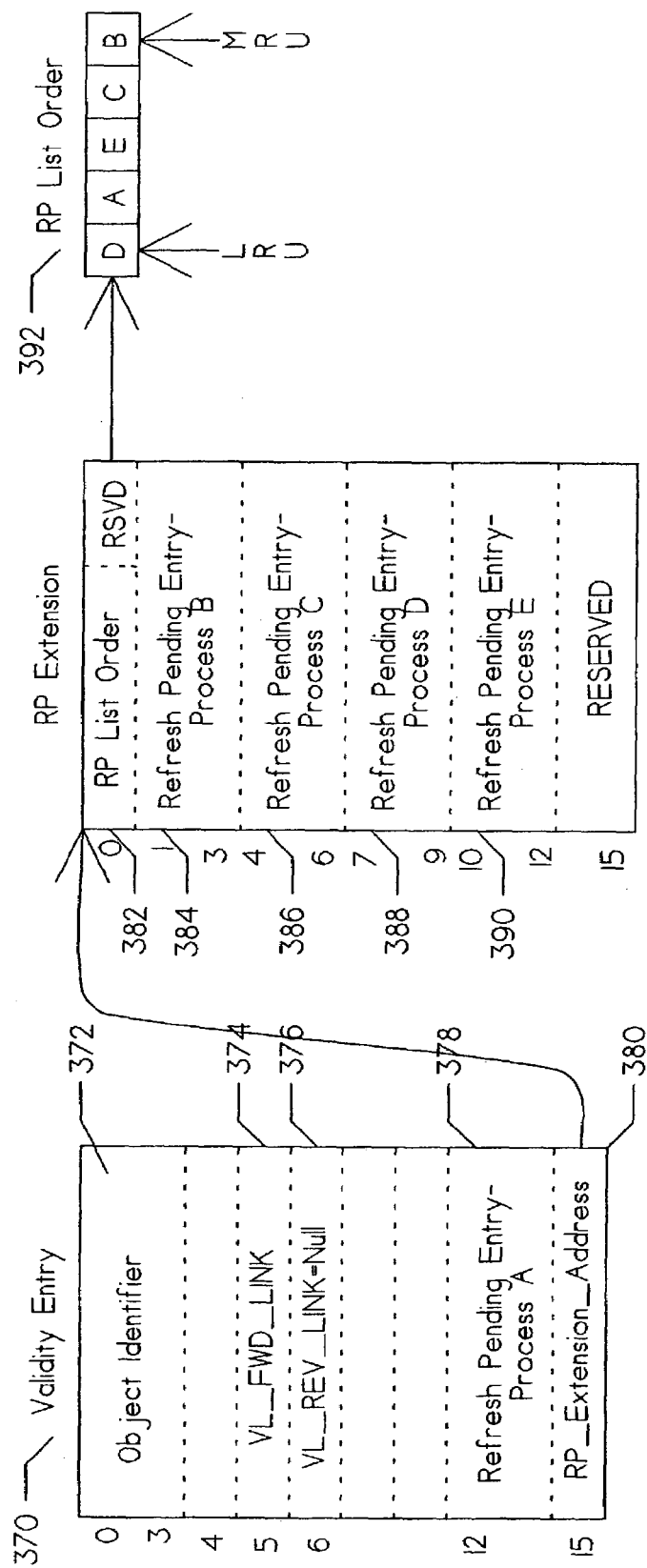
FIG. 13 is a detailed diagram showing operation of the refresh pending entries.

FIG. 13 is detailed diagram showing the format of Validity Entry 370 with Refresh Pending Extension. Validity Entry 370 contains VL_FVD_LINK 374 and VL_REV_LINK 376, as previously discussed. In this example, the validity entry (i.e., Validity Entry 370) is shown with five processes within the same sub-application in 'refresh pending' state. Refresh Pending Entry-Process A 378 shows that Process A was the first referenced for this validity entry. The order of the processes in the RP Extension entries (i.e., entries 384, 386, 388, and 390) indicates that the processes initially referenced the validity entry in the order of A-B-C-D-E. However, subsequent references to the same validity entry occurred in a different order. The 'RP List Order' 382 maintains an LRU/MRU list of the current processes in the Refresh Pending entries. In the example shown at detail 392, process B referenced the validity entry most recently, whereas process D referenced the validity entry least recently (i.e., or oldest reference). The RP Extension is addressed by RP_Extension_Address 380.

Figure 14:
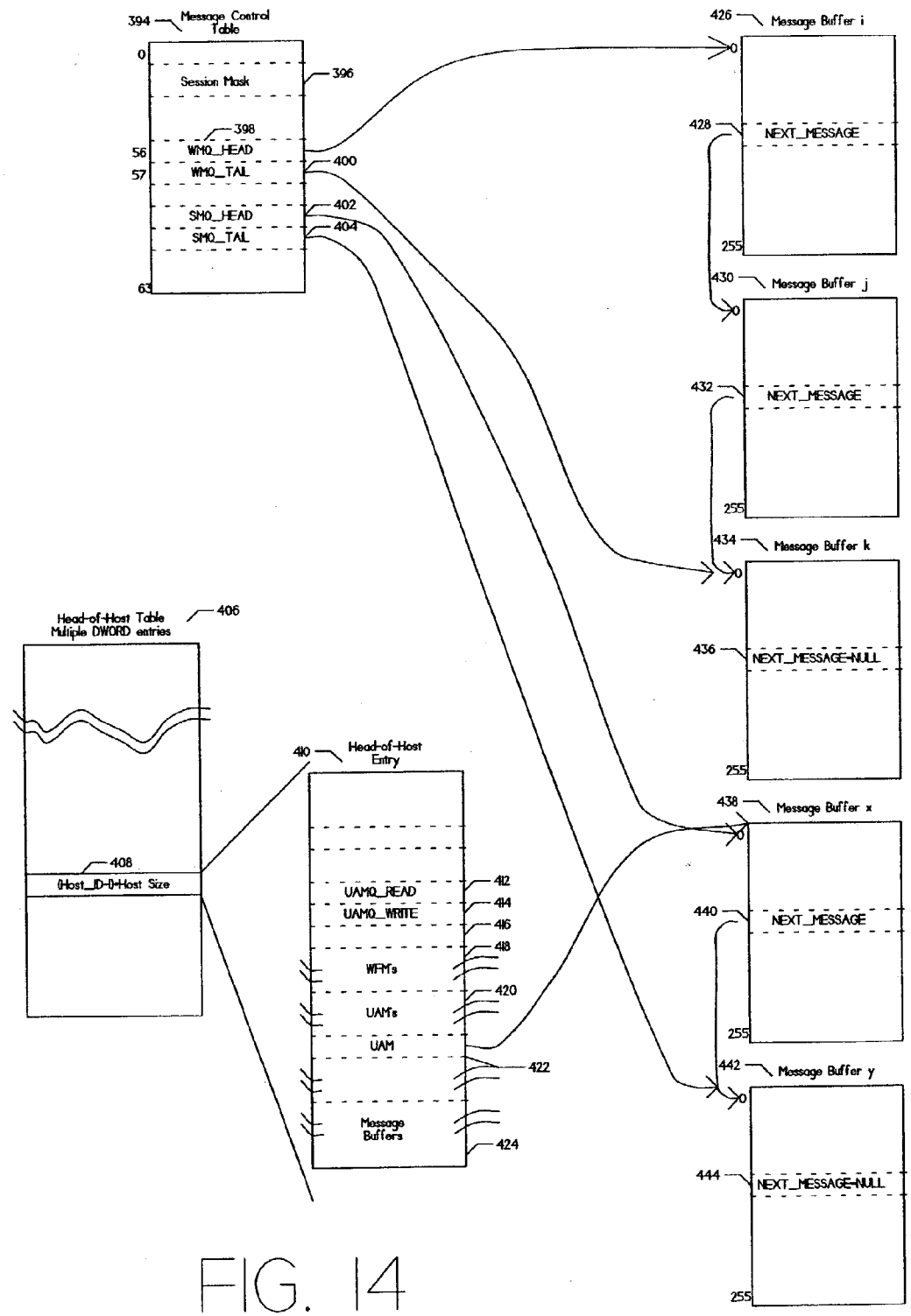
FIG. 14 is a detailed diagram showing operation of messages.

FIG. 14 is a detailed diagram showing the messaging implementation. In the example shown, messages (represented by message buffers i 426, j 430, and k 434) reside on the 'waiting message queue' (WMQ), waiting for a wait-for-message (WFM) from each addressed host. Message Control Table 394 points to Message Buffer i 426 via WMQ_HEAD 398 and to Message Buffer k 434 via WMQ_TAIL 400. The three message buffers are internally linked via NEXT_MESSAGE 428, 432, and 436. Messages (represented by Message Buffers x 438 and y 442) have been sent to the host(s) but have not yet been acknowledged, and both are members of the 'sent message queue' (SMQ). SMQ_HEAD 402 points to Message Buffer x 438 and SMQ_TAIL 404 points to Message Buffer y 442. Message Buffer 'x' 438 belongs to the host corresponding to the shown head-of-host (HOH) entry, and Message Buffer 'y' 442 belongs to some other host. NEXT_MESSAGE 440 links the two message buffers in the sent message queue.

The message buffers are shown as separate entries for purposes of clarity and are derived from the Message Buffers in the Head-of-Host entries. The collection of Message Buffers in a HOH entry 410 are known as a Host Message Buffer Queue (HMBQ). In the example shown, Message Buffer 'x' 438 resides within the Message Buffers 422 of the shown HOH entry 410. A Head-of-Host Table (HOHT) 406 contains an entry for each of the 64 possible hosts, each table entry contains an array of active Wait-For-Message commands (WFMs), an array of Unacknowledged Messages (UAMs), and an array of message buffers. The Message Control Table (MCT) contains the addresses of the global data structures and test-and-set lock structures required by IHM (inter-host messaging).

Figure 15:
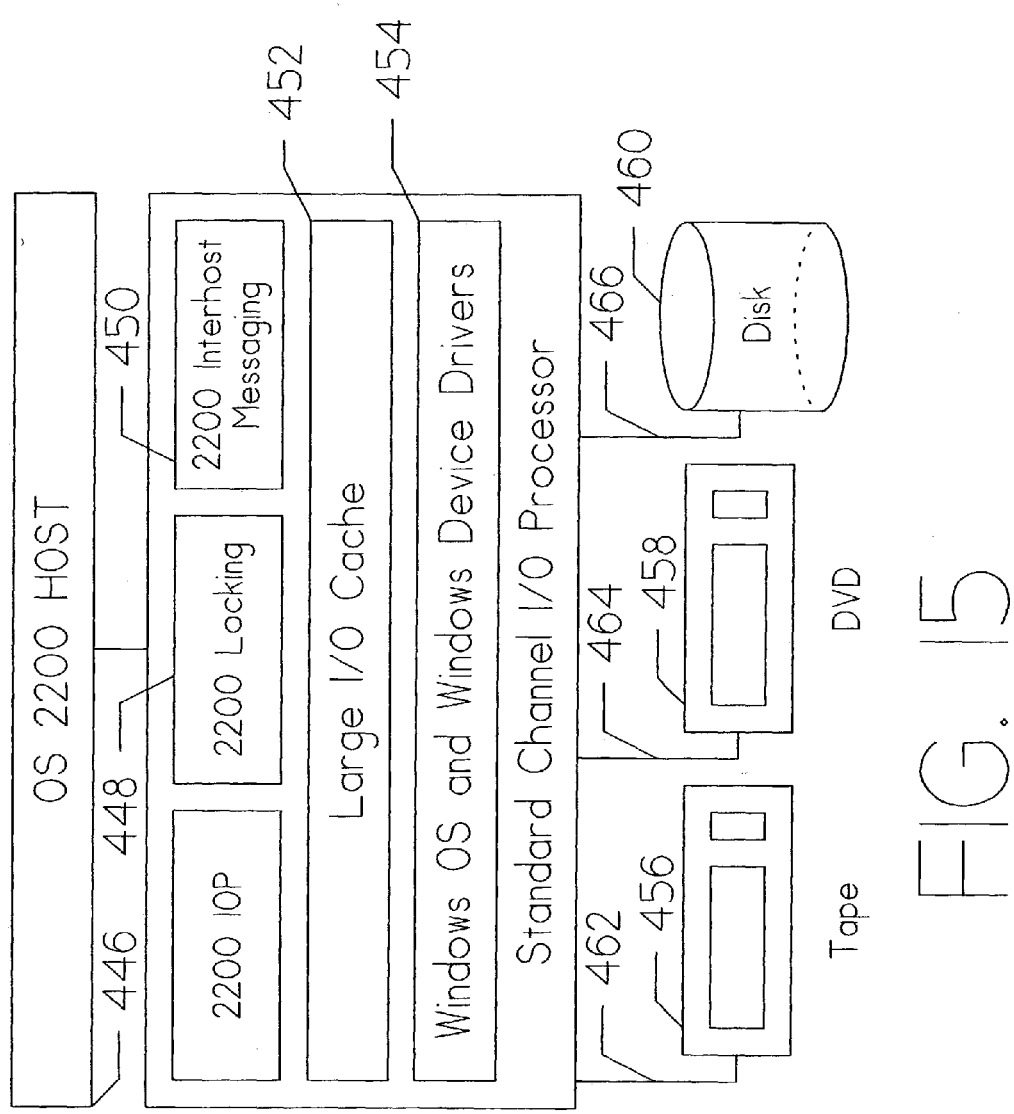
FIG. 15 is a detailed diagram showing integration of the various functions into a single platform.

FIG. 15 is a detailed diagram showing integration of the cluster/locking, caching, and mass storage accessing functions into a single platform. In the actual hardware, the OS 2200 host 446 communicates directly with the single platform incorporating the 2200 IOP 446, 2200 Locking 448, and 2200 Interhost Messaging 450 functionality as shown.

Also included within the same single platform is Large I/O Cache 452, Windows Operating system and Device Drivers 454, and the Standard Channel I/O Processor as shown. The present invention incorporates each of these elements into a single platform. Therefore, communication with Tape 456, DVD 458, and Disk 460, via paths 462, 464, and 466, respectively, is accomplished within the same hardware entity as is interfaced directly with OS 2200 Host 446.

Figure 16:
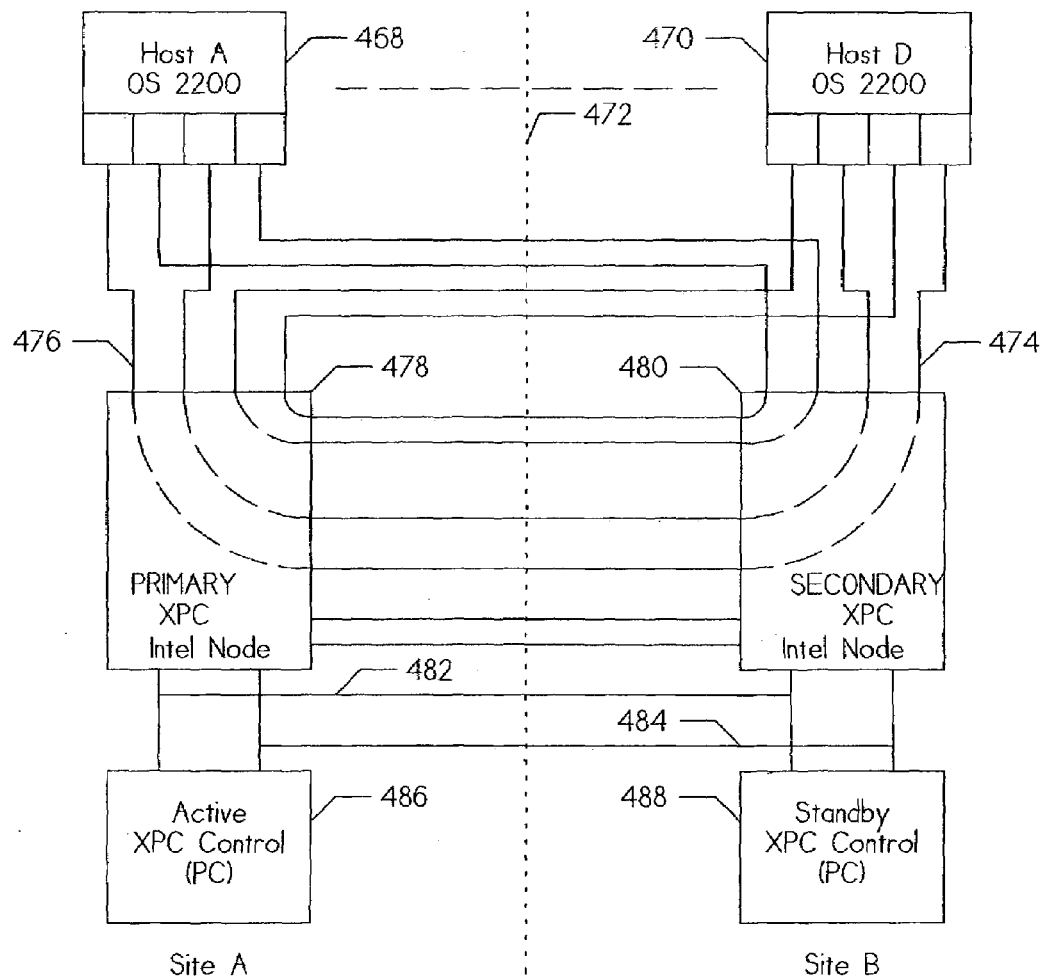
FIG. 16 is a detailed schematic drawing showing operation of failure recovery under the present invention.

FIG. 16 is detailed schematic diagram showing operation of the failure recovery facilities of the present invention. Host A 468 and Host B 470 are preferably Unisys 2200 systems as explained above. Each is redundantly coupled to each of Primary XPC 478 and Secondary XPC 480. Path 474 represents the request/status packet routing path for normal operation of the configuration for Host D 470. Similarly, path 476 represents the request/status routing path for Host A 468.

As explained above, Secondary XPC 480 cannot assume the failure of Primary XPC 478 from a simple failure of inter-server message traffic, because this could result from failure of the inter-server interfaces. Therefore, to completely diagnose failure of Primary XPC 478 for the purposes of converting Secondary XPC to the master role, Active XPC Control 486 must also verify failure of Primary XPC 478 via its separate, dedicated, and redundant interfaces as shown.

Through the use of redundant Standby XPC Control 488, the system provides for possible failure of Active XPC Control 486. Furthermore, Active XPC Control 486 and Standby XPC Control 488 communicate via redundant LAN's 482 and 484. To provide further resiliency, Active XPC Control 486 and Standby XPC Control 488 can be located at different geographical sites, as shown.

Figure 17:
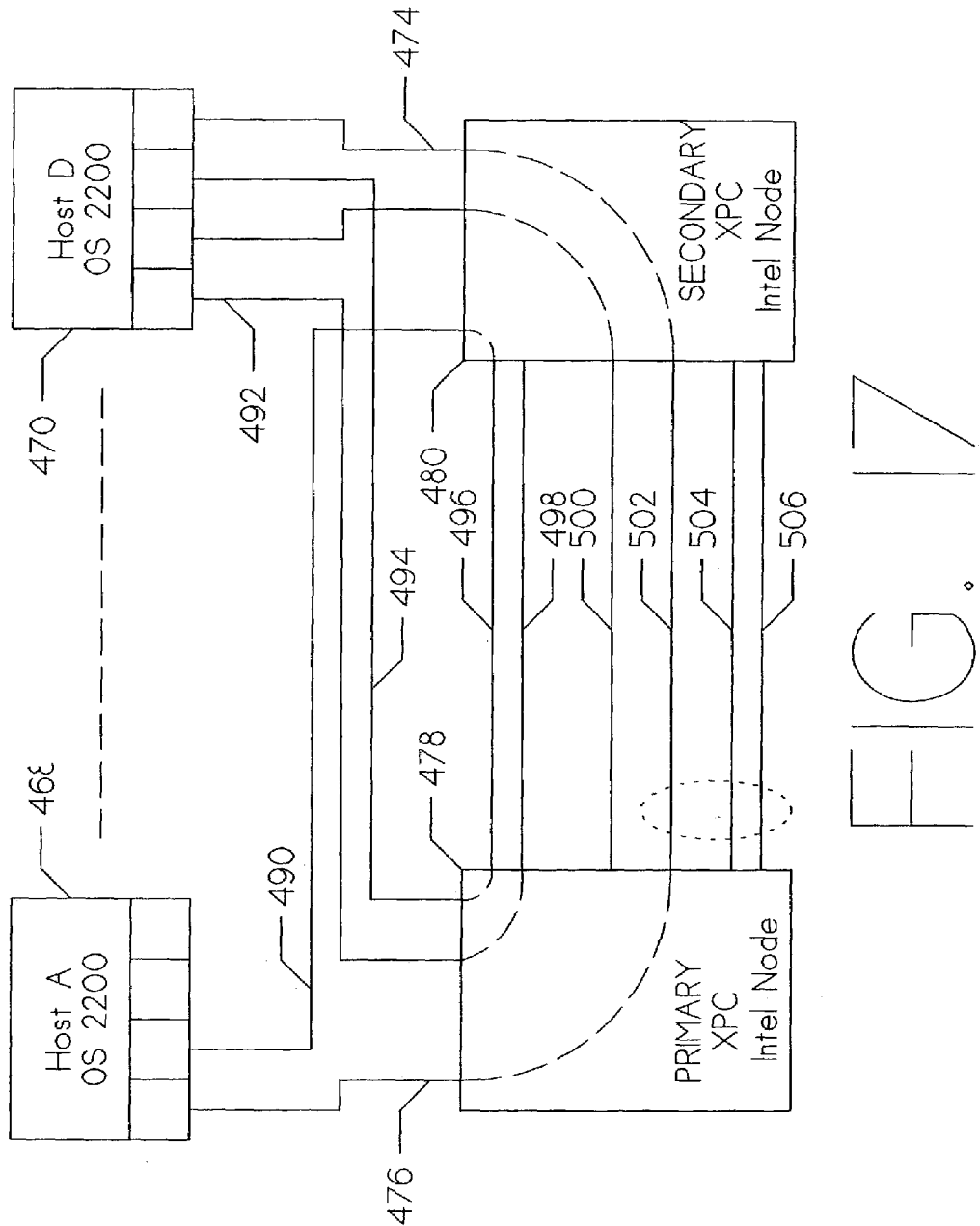
FIG. 17 is a detailed schematic drawing showing recovery from failure of the master cluster lock server.

FIG. 17 is a detailed schematic diagram showing recovery from the failure of Primary XPC 478. Upon initiation of system operation in accordance with the present example, Primary XPC 478 has assumed the master role. Therefore, to honor service requests, Host A 468 communicates directly with Primary XPC 478 via path 476 and Host D communicates directly with Primary XPC 478 via path 492. Furthermore, service requests sent via path 490 (from Host A 468) and via path 474 (from Host D 470) are routed indirectly to Primary XPC 478 via Secondary XPC 480 and crossover paths 496 and 502.

Upon failure of Primary XPC 478, no further service requests are honored by it. As a result, messages sent to Primary XPC 478 via any of the paths 476, 492, 494, 496, 500, and 502 will all time out. The direct service requests (i.e., from Host A 468 via path 476 and from Host D 470 via paths 492 and 494) will simply be reinitiated, and, of course, time out again.

The indirect service requests (i.e., from Host A 468 via path 490 and from Host D 470 via path 474) will also be reinitiated. However, Secondary XPC 480 will assume the role of Master upon the failure of Primary XPC 478. Therefore, Secondary XPC 480 will honor the reinitiated service requests received via paths 490 and 474, rather than forwarding them to the failed Primary XPC 478. As to Host A 468 and Host D 470 it makes no difference whether Primary XPC 478 or Secondary XPC 480 honors the service requests. Therefore, there is no specialized logic required within either Host A 468 or Host D 470 to accommodate recovery from a failure of Primary XPC 478.

As explained above, the direct service requests (i.e., from Host A 468 via path 476 and from Host D 470 via path 492) will time out a second time after having been reinitiated. As a result, Host A 468 will assume a failure of path 476 and Host D 470 will assume a failure of path 492. Because Host A 468 has only one other interface (i.e., path 490), it will use it to reinitiate the twice timed out service request. It would be an indirect request, but for the failure of Primary XPC 478. However, it becomes a direct request to Secondary XPC 480, which has assumed the master role and which will honor the service request without further reinitiation.

Host D 470 has an interface (i.e., path 494) which is the redundant back up to path 492. As a result, Host D 470 assumes the failure of path 492 after the second time out. It will reinitiate the service request twice over path 494 and experience two time outs, before resorting to path 474. Because the service request on path 474 is directed to Secondary XPC 480, which is acting in the master role, it is honored without further time outs.

It is apparent that the system architecture of the present invention can recover from the failure of a cluster lock server (i.e., either Primary XPC 478 or Secondary XPC 480) without any specialized logic within any host computer (i.e., Host A 468 . . . Host D 470). It is only necessary that a host computer reinitiate service requests which have not been honored, and that such reinitation occurs on another redundant interface after any two succeeding time outs.

Figure 18:
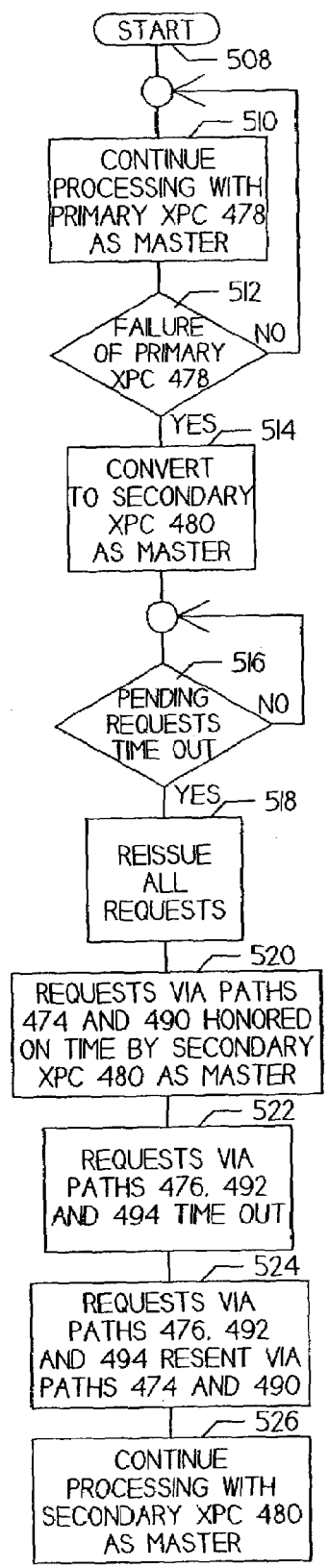
FIG. 18 is a detailed flow chart showing operation of the process shown in FIG. 17.

FIG. 18 is a detailed flow diagram showing the operation of the process of FIG. 17 from the vantage point of Host A 468. Entry is via element 508. In this example, processing continues with Primary XPC 478 serving in the role of master (see also FIG. 510) at element 510 until a failure of Primary XPC 478 is detected by element 512. The detection process is described above in greater detail.

When element 512 detects the failure of Primary XPC 478, control is given to element 514 for conversion of the system to Secondary XPC 480 in the master role. Because of the recovery protocol of the present invention, the failure detection of element 512 results only in the conversion of the master/slave relationship. No notification to any host computer or ultimate user is required. The host computer(s) and ultimate user(s) are simply programmed to time out various interfaces and to utilize an alternative redundant interface following two consecutive time outs.

Thus, element 516 searches for time outs of the interfaces between Host A 468 and the cluster/lock processing system. In accordance with the present example, these interfaces consist of direct path 476 and indirect path 490 (see also FIG. 17 and accompanying discussion above). When the requests time out, control is given to element 518 to reinitiate the requests. For the purposes of simplicity of FIG. 18, all message time outs are treated as a single entity. In normal operation, a plurality of requests would be involved with each request treated separately. However, the result would be the same as in the example because of the assumed complete failure of Primary XPC 478.

After reinitiation, all requests transferred via paths 474 and 490 are honored at element 520 by Secondary XPC 480 operating in the master role following the conversion of element 514. However, requests reinitiated for transfer via paths 476 and 492 time out for the second time at element 522 because of the complete failure of Primary XPC 478. Because these requests timed out for the second time, Host A 468 and Host B 470 assume that paths 476 and 492 are no longer operative. Therefore, these requests are reinitiated via paths 474 and 490 at element 524.

At element 526 the system continues normal operation with Secondary XPC 480 performing in the master role. Thus, Primary XPC 478, previously operating in the master role, has failed and been replaced with Secondary XPC 480 without any assistance from the Host computer(s). In fact, other than the ministerial functions of timing out request transfers and selecting an alternative interface, the Host computer(s) have no role to play with regard to recovery from such a major system failure.

Having thus described the preferred embodiments of the present invention, those of skill in the art will be readily able to adapt the teachings found herein to yet other embodiments within the scope of the claims hereto attached.

We claim:

1. An apparatus comprising:
   a. describing means for describing a service request;
   b. a plurality of commodity cluster instruction processors;
   c. first managing means responsively coupled to said describing means and to each of said plurality of commodity cluster instruction processors for managing said plurality of commodity cluster instruction processors to honor said service request;
   d. permitting means responsively coupled to said first managing means for permitting said first managing means to assign said describing means to a selected one of said plurality of commodity cluster instruction processors for said honoring of said service request;
   e. redundant managing means responsively coupled to each of said plurality of commodity cluster instruction processors for managing said plurality of commodity cluster instruction processors upon failure of said first managing means; and
   f. switching means responsively coupled to said first managing means and said redundant managing means for switching from said first managing means to said redundant managing means without notification to said describing means.

2. An apparatus according to claim 1 wherein each of said describing means further comprises a first host computer.

3. An apparatus according to claim 2 wherein a first portion of said switching means is resident in said first managing means and a second portion of said switching means is resident in said redundant managing means.

4. An apparatus according to claim 3 further comprising a second host computer responsively coupled to said first managing means and said redundant managing means.

5. An apparatus according to claim 4 wherein said first host computer and said second host computer further comprises Unisys OS2200 mainframe computers.

6. An apparatus comprising:
   a. a plurality of commodity cluster instruction processors;
   b. a primary cluster lock server having a first copy of a software cluster lock manager responsively coupled to each of said plurality of commodity cluster instruction processors;
   c. a secondary cluster lock server having a second copy of said software cluster lock manager responsively coupled to each of said plurality of commodity cluster instruction processors;
   d. a first host computer separate and independent of said plurality of commodity cluster instruction processors responsively coupled to said primary cluster lock server via said first copy of said software cluster lock manager and said secondary cluster lock server via said second copy of said software cluster lock manager which submits a service request; and
   e. a component responsively coupled to said primary cluster lock server and secondary cluster lock server which substitutes said secondary cluster lock server for said primary cluster lock server without assistance from said host computer.

7. The apparatus of claim 6 wherein said primary cluster lock server further comprises a dedicated cache memory.

8. The apparatus of claim 7 wherein each of said primary cluster lock server and said secondary lock server further comprise Windows operating system.

9. The apparatus of claim 8 further comprising a second host computer separate and independent of said plurality of commodity cluster instruction processors responsively coupled to said primary cluster lock server via said first copy of said software cluster lock manager.

10. The apparatus of claim 9 wherein said second host computer is responsively coupled to said secondary cluster lock server via said second copy of said software cluster lock manager.

11. A method of enhancing availability of a data processing system comprising:
   a. assigning a first cluster lock server the role of master;
   b. assigning a second cluster lock server the role of slave;
   c. transferring a first service request from a first host to said second cluster lock server via a second copy of a software cluster lock manager located within said second cluster lock server;
   d. transferring said first service request from said second cluster lock server to said first cluster lock server;
   e. checking operation of said first cluster lock server using software within said first cluster lock server, said second cluster lock server, and a first control platform;
   f. switching said first cluster lock server to the role of slave without assistance of host; and
   g. switching said second cluster lock server to the role of master without notice to said first host thereby permitting said first host to continue to communicate with said second cluster lock server via said second copy of said software cluster lock manager.

12. A method according to claim 11 further comprising transferring a second service request from said first host to said first cluster lock server via a second copy of said software cluster lock manager located within said first cluster lock server.

13. A method according to claim 12 further comprising re-transferring said second service request from said first cluster lock server to said second cluster lock server after said second switching step.

14. A method according to claim 13 further comprising transferring a third service request from a second host to said first cluster lock server.

15. A method according to claim 14 further comprising re-transferring said third service request from said first cluster lock server to said second cluster lock server after said second switching step.

16. A data processing system comprising:
   a. a plurality of commodity cluster instruction processors;
   b. a first cluster lock server responsively coupled to each of said plurality of commodity cluster instruction processors having a first internal cache memory and a first Input/Output processor and having a first copy of a software cluster lock manager;
   c. a second cluster lock server responsively coupled to each of said plurality of commodity cluster instruction processors having a second internal cache memory and a second Input/Output processor and having a second copy of said software cluster lock manager;
   d. a first host computer separate and independent of said plurality of commodity cluster instruction processors responsively coupled to said first cluster lock server via said first copy of said software cluster lock manager and said second cluster lock server via said second copy of said software cluster lock manager which initiates a first service request and transfers it to said second cluster lock server; and
   e. a facility responsively coupled to said first cluster lock server and to said second cluster lock server which is capable of switching said first cluster lock server to functions of said second cluster lock server and switching said second cluster lock server to functions of said first cluster lock server.

17. The improvement according to claim 16 wherein said first cluster lock server and said second cluster lock server further comprise a Windows operating system.

18. The improvement according to claim 17 wherein said first cluster lock server and said second cluster lock server are located at different geographical sites.

19. The improvement according to claim 18 further comprising a second host computer separate and independent of said plurality of commodity cluster instruction processors responsively coupled to said first cluster lock server and said second cluster lock server.

20. The improvement according to claim 19 wherein said first host computer and said second host computer are not co-located.

* * * * *